US011121553B2

(12) United States Patent
Tsujii et al.

(10) Patent No.: US 11,121,553 B2
(45) Date of Patent: Sep. 14, 2021

(54) POWER SYSTEM STABILITY ANALYSIS DEVICE, STABILIZATION APPARATUS, AND METHOD (71) Applicant: Hitachi, Ltd., Tokyo (JP)

(72) Inventors: Yuki Tsujii, Tokyo (JP); Masatoshi Kumagai, Tokyo (JP); Kenedward Kawakita, Tokyo (JP); Masahiro Watanabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/652,091

(22) PCT Filed: Oct. 31, 2017

(86) PCT No.: PCT/JP2017/039308
§ 371 (c)(1),
(2) Date: Mar. 30, 2020

(87) PCT Pub. No.: WO2019/087292
PCT Pub. Date: May 9, 2019

(65) Prior Publication Data
US 2020/0251902 A1 Aug. 6, 2020

(51) Int. Cl.
*H02J 3/24* (2006.01)
*H02J 13/00* (2006.01)
*G05B 15/02* (2006.01)

(52) U.S. Cl.
CPC .............. *H02J 3/24* (2013.01); *G05B 15/02* (2013.01); *H02J 13/00002* (2020.01); *H02J 2203/20* (2020.01)

(58) Field of Classification Search
CPC .... H02J 3/24; H02J 13/00002; H02J 2203/20; G05B 15/02; Y02B 90/20; Y04S 20/00
See application file for complete search history.

(56) References Cited

U.S. PATENT DOCUMENTS 8,190,379 B2* 5/2012 Rehtanz .............. H02J 3/24
702/57
9,077,200 B2* 7/2015 Majumder ............ H02J 3/06
(Continued)

FOREIGN PATENT DOCUMENTS

JP 2013-506389 A 2/2013
JP 2016-025715 A 2/2016

OTHER PUBLICATIONS

International Search Report of PCT/JP2017/039308 dated Dec. 19, 2017.

*Primary Examiner* — Ramesh B Patel
(74) *Attorney, Agent, or Firm* — Mattingly & Malur, PC (57) ABSTRACT There is provided a power system stability analysis device that analyzes stability of a power system by obtaining measurement data from a high-accuracy measurement device and existing measuring instruments installed in the power system, the apparatus including: a system state estimation unit that estimates a system state of the power system by using measurement data from the existing measuring instruments at a plurality of points in the power system; a synchronous stability analysis unit that analyzes synchronous stability in an assumed failure by using an estimation result of the system state; and a synchronous stability analysis correction unit that corrects the synchronous stability according to a difference between the estimation result of the system state and the measurement data of the high-accuracy measurement device to improve accuracy of synchronous stability analysis of the power system.

11 Claims, 8 Drawing Sheets

(56) References Cited

U.S. PATENT DOCUMENTS

| | | | | |
|---|---|---|---|---|
| 9,178,386 | B2* | 11/2015 | Duan | H02J 13/00034 |
| 9,513,648 | B2* | 12/2016 | Forbes, Jr. | G05B 13/0255 |
| 2003/0203717 | A1* | 10/2003 | Chuprun | G06K 13/0825 |
| | | | | 455/12.1 |
| 2012/0283967 | A1* | 11/2012 | Duan | H02J 13/00002 |
| | | | | 702/60 |
| 2018/0054058 | A1* | 2/2018 | Kumagai | H02J 3/18 |
| 2018/0120818 | A1* | 5/2018 | Omi | G05B 19/41885 |
| 2018/0375329 | A1* | 12/2018 | Kuroda | H02J 13/00002 |
| 2019/0237997 | A1* | 8/2019 | Tsujii | H02J 13/0006 |
| 2019/0305590 | A1* | 10/2019 | Ito | H02H 7/20 |

\* cited by examiner

|  | SYSTEM STATE ESTIMATION RESULT | PMU MEASUREMENT VALUE | CORRECTION MODEL |
|---|---|---|---|
| ⋮ |  |  |  |
| POWER SUPPLY RESTRICTION TABLE A | ○○ | ○○ | ○○ |
| POWER SUPPLY RESTRICTION TABLE B | △△ | △△ | △△ |
| POWER SUPPLY RESTRICTION TABLE C | □□ | □□ | □□ |
| ⋮ |  |  |  |

POWER SYSTEM STABILITY ANALYSIS DEVICE, STABILIZATION APPARATUS, AND METHOD

TECHNICAL FIELD

The present invention relates to a power system stability analysis device, a stabilization apparatus, and a method.

BACKGROUND ART

As a background art in this technical field, there is disclosed in U.S. Pat. No. 8,190,379 (PTL 1). It is important to correctly understand the power flow state (active power P, reactive power Q, voltage V, voltage phase δ) of a power system for power system stability analysis. By reproducing a state close to a current power system with an analysis model, it is possible to predict the state of the power system in the event of a failure and to perform a stabilization measure in preparation for a power system failure in advance. In general, the state of the power system is grasped by a system state estimation calculation using measurement values (active power P, reactive power Q, voltage magnitude V, voltage phase δ, current I, and the like) of the amount of electricity measured by a measurement sensor installed in the power system.

In order to grasp the state of the power system, it is important to prepare a sufficient number of measurement values to solve the power equation of the power system and make the values observable, but depending on the configuration of the power system and the power flow conditions (if there is a section where the resistance component of a line is large, if there is a section where the reactive power flow is large, if, for example, the voltage values of adjacent measurement values are significantly different, or the like), the system state estimation calculation does not converge in some cases. When the system state estimation calculation does not converge, there is a problem that a large error occurs between a current system state and the calculated value in a previous calculation, and the reliability of the obtained estimation result decreases. In particular, this problem is likely to occur in areas where the monitoring function and measurement accuracy of the power system are insufficient.

When the reliability of the estimation result decreases, the reliability of the synchronous stability analysis of the power system also decreases. In a power system stabilization apparatus, for example, if an incorrect synchronous stability analysis result is input and a power-controlled generator is determined, appropriate power control for preventing a power failure cannot be taken, and there is a risk of power failure. The power system stabilization apparatus is an apparatus that disconnects (electrically controls) the accelerated generator from the power system in order to prevent the occurrence of the phenomenon that the internal phase difference angle of the accelerated generator with respect to a reference generator becomes larger than that of other generators due to a power system failure, and synchronization between generators cannot be maintained.

At present, the spread of a technique employing a high-accuracy measurement device such as a phase measurement device phasor measurement unit (PMU) and the like is expected. For example, PTL 1 discloses a power flow monitoring device for a power system that verifies the accuracy of system state estimation by using a phase measurement device PMU. PTL 1 discloses that the validity of system state estimation is verified by comparing a system state estimation result with data of a phase measurement device PMU.

CITATION LIST

Patent Literature

PTL 1: U.S. Pat. No. 8,190,379

SUMMARY OF INVENTION

Technical Problem

However, in the power flow monitoring device for a power system described in PTL 1, it is not known how much a state estimation error affects the synchronous stability of the power system. Therefore, appropriate measures such as power control cannot be taken, which may lead to an increase in cost due to measures such as excessive power control and a power failure due to measures such as insufficient power control.

From the above, an object of the present invention is to provide a power system stability analysis device, a stabilization apparatus, and a method capable of preventing excessive and insufficient power supply restrictions of the power system stabilization apparatus by using a measurement value of a high-accuracy measurement device to improve the accuracy of a synchronous stability result, in a case where the calculation of state estimation does not converge or the accuracy is low.

Solution to Problem

In order to solve the above-mentioned problems, the present invention is directed to "a power system stability analysis device that analyzes stability of a power system by obtaining measurement data from a high-accuracy measurement device and existing measuring instruments installed in the power system, the device including: a system state estimation unit that estimates a system state of the power system by using the measurement data from the existing measuring instruments at a plurality of points in the power system; a synchronous stability analysis unit that analyzes synchronous stability in an assumed failure by using an estimation result of the system state; and a synchronous stability analysis correction unit that corrects the synchronous stability according to a difference between the estimation result of the system state and the measurement data of the high-accuracy measurement device to improve accuracy of synchronous stability analysis of the power system".

The present invention is directed to "a power system stabilization analysis method for analyzing stability of a power system by obtaining measurement data from a high-accuracy measurement device and existing measuring instruments installed in the power system, the method including: estimating a system state of the power system by using the measurement data from the existing measuring instruments at a plurality of points in the power system; analyzing synchronous stability in an assumed failure by using an estimation result of the system state; and correcting the synchronous stability according to a difference between the estimation result of the system state and the measurement data from the high-accuracy measurement device to improve accuracy of synchronous stability analysis of the power system".

The present invention is directed to "the power system stabilization method including: determining and storing an appropriate power-controlled generator for preventing a power failure in the event of an assumed failure in the power system by using the synchronous stability after correction; and controlling the determined power-controlled generator in the event of the assumed failure".

The present invention is directed to "the power system stabilization method including: determining and storing an appropriate power-controlled generator for preventing a power failure in the event of an assumed failure in the power system by using the synchronous stability after correction; selecting one of the synchronization stability when not performing correction and when performing correction; and selecting the synchronous stability after correction when a difference between the synchronous stability before correction and after correction is equal to or greater than a threshold".

Advantageous Effects of Invention

According to the present invention, in a case where the calculation of the state estimation does not converge or the accuracy is low, it is possible to prevent excessive and insufficient power supply restrictions of the power system stabilization apparatus by using the measurement value of the high-accuracy measurement device to improve the accuracy of the synchronous stability result.

DESCRIPTION OF EMBODIMENTS

Hereinafter, preferred examples of the present invention will be described with reference to drawings. The following is merely examples, and the invention itself is not intended to be limited to the following specific contents.

Example 1

Example 1 of the present invention will be described below.

Figure 2:
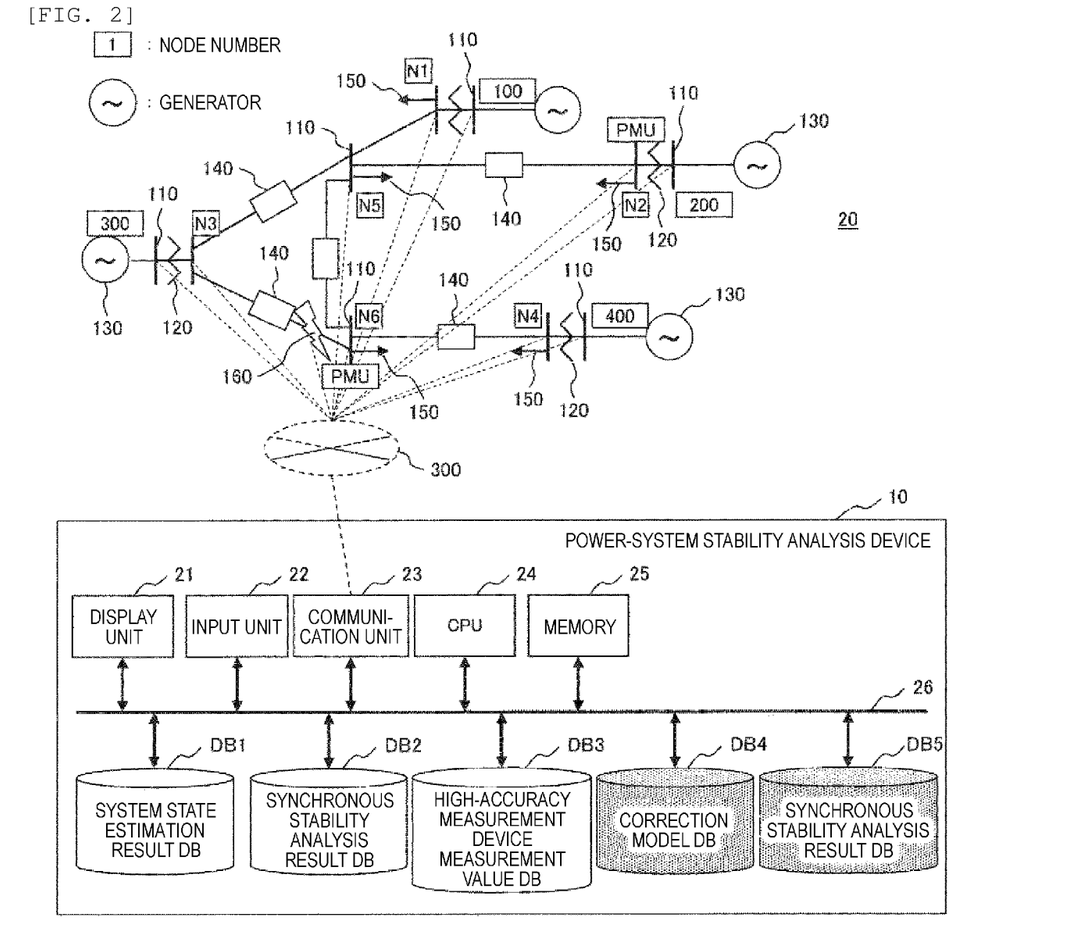
FIG. 2 is a diagram illustrating an example of a typical power system to which the example of the present invention can be applied, and a hardware configuration of the power system stability analysis device according to the example of the present invention.

First, an example of a typical power system to which an example of the present invention can be applied and an example of a hardware configuration of a power system stability analysis device according to the example of the present invention will be described with reference to FIG. 2. The upper part of FIG. 2 illustrates a configuration example of a power system, and the lower part of FIG. 2 illustrates an example of a hardware configuration of a stabilization apparatus. An example of the configuration of the power system in the upper part will be described.

In the upper part of FIG. 2, a power system 20 is a system in which a plurality of generators 130 and loads 150 are interconnected via buses (nodes) 110, transformers 120, transmission lines 140, and the like. In FIG. 2, a reference numeral 160 indicates a location of an assumed failure in the power system.

In FIG. 2, node numbers N (N1, N2, N3, N4, N5, and N6) illustrated are given to the nodes 110 as appropriate. Various measuring instruments (not illustrated) for protection, control, and monitoring of the power system are appropriately installed at the nodes 110, and signals detected by the measuring instruments are taken into a power system stability analysis device 10 via a communication network 300.

In the illustrated example, for example, phase measurement device phasor measurement units (PMU) are installed as a high-accuracy measurement device at the nodes 110 having the node numbers N2 and N6, and at the other nodes 110 having the node numbers N1, N3, N4, and N5, for example, a current transformer CT, a voltage transformer PT, and the like are installed as a measurement device of related art.

In the ordinary power system illustrated in FIG. 2, the fact is that there are nodes where high-accuracy measurement devices PMU are installed and nodes where only existing measuring instruments are installed, and the actual situation is that the nodes where expensive high-accuracy measurement devices PMU can be installed are limited. For this reason, it is possible to accurately perform the state estimation of the power system at the node where the high-accuracy measurement device PMU is installed, but the state estimation of the power system at the nodes where only other existing measuring instruments are installed is inevitably inferior in accuracy.

Therefore, in the present invention, the accuracy of the entire power system is to be improved by reflecting the measurement result of the node where the high-accuracy measurement device PMU is installed in the measurement result of the node where the high-accuracy measurement device PMU is not installed.

Figure 1:
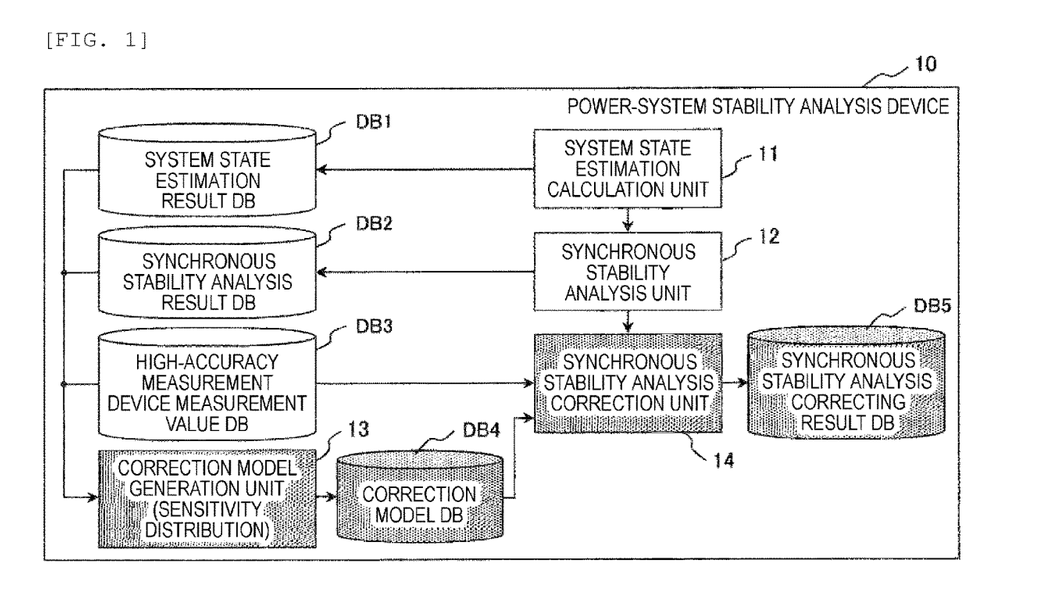
FIG. 1 is a diagram illustrating an example of a software configuration of a power system stability analysis device according to an example of the present invention.

The power system stability analysis device 10 illustrated in the lower part of FIG. 1 is configured by a computer system, a display unit 21 such as a display device and the like, an input unit 22 such as a keyboard, a mouse, and the like, a communication unit 23, a CPU 24, a memory 25, and various databases DB are connected to a bus line 26.

The databases DB include a system state estimation result database DB1, a synchronous stability analysis result database DB2, a high-accuracy measurement device measurement value database DB3, a correction model DB4, and a synchronous stability analysis correcting result DB5. The signals taken into the power system stability analysis device 10 via the communication network 300 are appropriately stored and kept in the databases DB as described above, either directly as primary information or indirectly in the form of secondary information obtained by processing the primary information. However, the signal measured by the high-accuracy measurement device PMU is stored and kept in the high-accuracy measurement device measurement value database DB3.

In FIG. 2, the display unit 21 may be configured to use, for example, a printer device or an audio output device instead of or together with the display device.

The input unit 22 can include, for example, at least one of a keyboard switch, a pointing device such as a mouse and the like, a touch panel, a voice instruction device, and the like.

The communication unit 23 includes a circuit and a communication protocol for connecting to the communication network 300.

The CPU 24 executes a calculation program, instructs image data to be displayed, and searches for data in various databases. The CPU 24 may be configured as one or a plurality of semiconductor chips, or may be configured as a computer device such as a calculation server.

The memory 25 is configured as, for example, a random access memory (RAM), and stores a computer program, and stores calculation result data and image data necessary for each processing. The screen data loaded in the memory 25 is sent to the display unit 21 and displayed.

FIG. 1 is a diagram illustrating an example of a software configuration of the power system stability analysis device 10 according to an example of the present invention.

The functional analysis of the power system stability analysis device 10 includes a state estimation calculation unit 11, a synchronous stability analysis unit 12, a correction model creation unit 13, and a synchronous stability analysis correction unit 14 as arithmetic processing functions, and can be represented as a device including the system state estimation result database DB1, the synchronous stability analysis result database DB2, the high-accuracy measurement device measurement value database DB3, the correction model DB4, and the synchronous stability analysis correcting result DB5 as storage functions.

In the processing in the power system stability analysis device 10, first, the state estimation calculation unit 11 estimates the power flow state of the power system from measurement data at a plurality of points in the power system. The estimated power flow state of the power system is used in the next synchronous stability analysis unit 12 and is loaded and stored as a system state estimation result in the system state estimation result database DB1.

Next, the synchronous stability analysis unit 12 analyzes the synchronous stability at the assumed failure from the system state estimation result obtained by the state estimation calculation unit 11. The analyzed synchronous stability is used in the next synchronous stability analysis correction unit 14 and is loaded and stored as a synchronous stability analysis result in the synchronous stability analysis result database DB2.

The processing in the state estimation calculation unit 11 and the synchronous stability analysis unit 12 described above is performed by using information measured by, for example, a current transformer CT, a voltage transformer PT, or the like as a measurement device of related art, which are installed at the nodes 110 having the node numbers N1, N3, N4, and N5 in the power system illustrated in FIG. 1. For this reason, according to the results of the stability analysis, it is inevitable that the accuracy may be inferior.

For this reason, in the present invention, the next synchronous stability analysis correction unit 14 performs the correction processing of the synchronous stability analysis processing. Two pieces of information are used for correction. One is information from the high-accuracy measurement device measurement value database DB3 storing and keeping the signal measured by the high-accuracy measurement device PMU installed at the nodes 110 having the node numbers N2 and N6, in the power system illustrated in FIG. 1. The other is correction information stored in the correction model database DB4. The synchronous stability analysis correction unit 14 corrects synchronous stability from the correction information stored in the correction model database DB4, the measurement value of the high-accuracy measurement device PMU, and the latest data of the synchronous stability analysis result.

The correction model database DB4 is formed by the processing in the correction model creation unit 13. The correction model creation unit 13 creates a sensitivity distribution of the power system from the system state estimation result stored in the system state estimation result database DB1, the high-accuracy measurement value stored in the high-accuracy measurement device measurement value database DB, and the past data of the synchronous stability analysis result stored in the synchronous stability analysis result database DB2. Thus, the sensitivity distribution at each node of the power system is stored in the correction model database DB4. This information is generator internal phase angle correction information that is a sensitivity distribution.

The synchronous stability analysis correction result obtained by the synchronous stability analysis correction unit 14 is loaded and stored in the synchronous stability analysis correction result database DB5.

Figure 3:
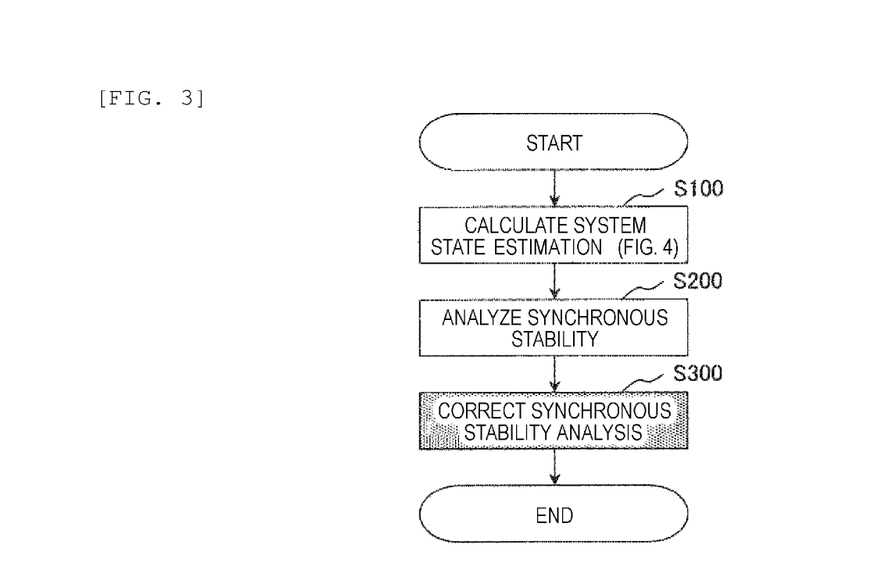
FIG. 3 is a diagram illustrating a flow of entire processing of the power system stability analysis device.

FIG. 3 is a flowchart illustrating entire processing of the power system stability analysis device.

In the processing step S100 in FIG. 3, the state of the power system is estimated based on the measurement data information at a plurality of measurement points. The processing step S100 corresponds to the function of the system state estimation calculation unit 11 in FIG. 1.

Figure 4:
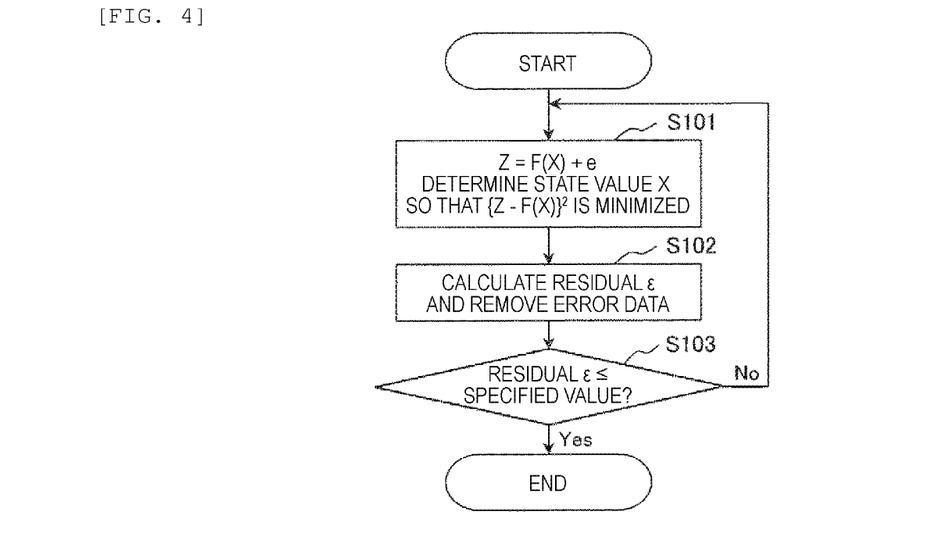
FIG. 4 is a flowchart illustrating an example of system state estimation processing.

FIG. 4 is a processing flow illustrating an example of the state estimation calculation. In the processing step S101, a state value X is determined from the relationship between an observed value Z, a system state value F, and a system error e expressed by Equation (1) so that the following Equation (2) is minimized.

Here, Z is an observed value (P, Q, V), X is a system state (V, θ, and the like), and F(X) is a circuit equation determined from, for example, the connection state and impedance of a circuit as state values.

[Equation 1]

$$Z = F(X) + e \tag{1}$$

[Equation 2]

$$\{Z - F(X)\}^2 \rightarrow \min \tag{2}$$

In the processing step S102, a residual ε is calculated, and error data is removed such that a measurement value having a large residual is removed or replaced with a substitute pseudo measurement value (past measurement data is used instead).

In processing step S103, the calculated residual ε is compared with a specified value. If the residual ε is equal to or smaller than the specified value, the processing flow of the state estimation calculation ends, and if the residual ε is equal to or larger than the specified value, the process returns to the processing step S101. Such a power system state estimation calculation is an established calculation method, and can be calculated by using a general algorithm.

Returning to FIG. 3, in the processing step S102, a generator internal phase angle is calculated by the synchronous stability analysis. The processing step S101 corresponds to the function of the synchronous stability analysis unit 12 in FIG. 1.

If a failure occurs in the power system, the generator may not be able to maintain the state of operating at the same frequency as the system, and the mechanism can be illustrated by a fluctuation equation and a power phase difference angle curve (P-δ curve).

In the power system, the fluctuation equation of the generator is expressed by a fluctuation equation of Equation (3) by using a mechanical input $P_m$, a generator inertia constant M, an electrical output $P_e$, and a generator phase difference angle δ.

[Equation 3]

$$P_m = M\frac{d^2\delta}{dt^2} + P_e \qquad (3)$$

From this equation, it can be seen that if the mechanical input $P_m$ and the electrical output $P_e$ are balanced, a synchronous generator will be operated at a constant speed. However, if the mechanical input and the electrical output are not balanced, the synchronous generator will accelerate or decelerate.

In the processing step S103, the synchronous stability analysis is corrected. At the time of correction, for example, a difference between a measurement value of a high-accuracy measurement device and a system state estimation result is used as an input value for correcting the synchronous generator. The generator internal phase angle is analyzed in advance by a computer, and the generator internal phase angle is corrected from the sensitivity distribution created by preliminary analysis. The processing step S103 corresponds to the function of the correction model creation unit 13 and the synchronous stability analysis correction unit 13 in FIG. 1.

The generator internal phase angle correction model, which is a sensitivity distribution, is created by performing synchronous stability analysis on past state estimation results and a number of assumed system states and performing regression analysis. The relationship between the generator internal phase angles before and after the correction and the difference between the measurement values of the measurement device of related art and the high-accuracy measurement device is calculated in advance.

Figure 5:
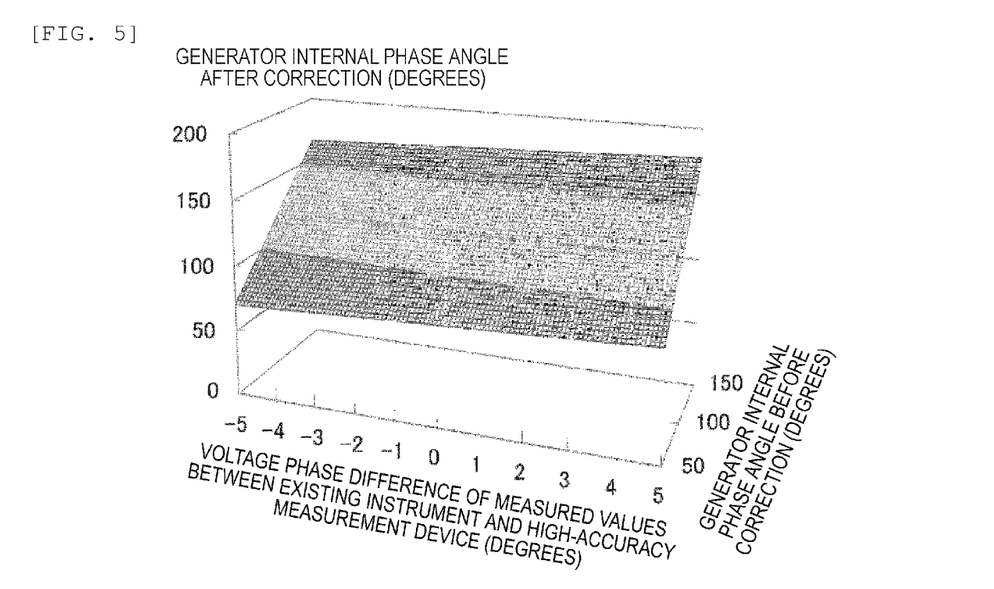
FIG. 5 is a diagram illustrating an example of a correction model for synchronous stability analysis.

FIG. 5 illustrates an example of the correction model. The correction model in FIG. 5 is represented in a three-dimensional space formed by three types of parameters, and these parameters are a voltage phase difference of the measurement values between the existing device and the high-accuracy measurement device (degrees), a generator internal phase angle before correction (degrees), and a generator internal phase angle after correction (degrees).

At the time of actual operation of the correction model created as illustrated in FIG. 5, by inputting the generator internal phase angle (analysis result by the synchronous stability analysis unit 12: generator internal phase angle (degrees) before correction) calculated by the synchronous stability analysis based on the state estimation result input, and the voltage phase difference between the measurement value of the measurement device of related art and the high-accuracy measurement device PMU to this model, the generator internal phase angle can be corrected, and the corrected generator internal phase angle (degrees) can be obtained.

For the information of the value to be compared, that is, the state quantity estimation result and the high-accuracy measurement device measurement value, any of the active power P, the reactive power Q, the voltage V, the voltage phase δ, or the like, or a plurality of parameters may be used as the power flow of the power system. The parameters to be used among the active power P, the reactive power Q, the voltage V, the voltage phase δ, and the like may be values of only one time section, or average values of a plurality of time sections. The state estimation result of the generator-installed node and the measurement value of the high-accuracy measurement device may be used, or the state estimation results of all the nodes at which the high-accuracy measurement device is installed and the measurement value of the high-accuracy measurement device may be used.

Figure 6:
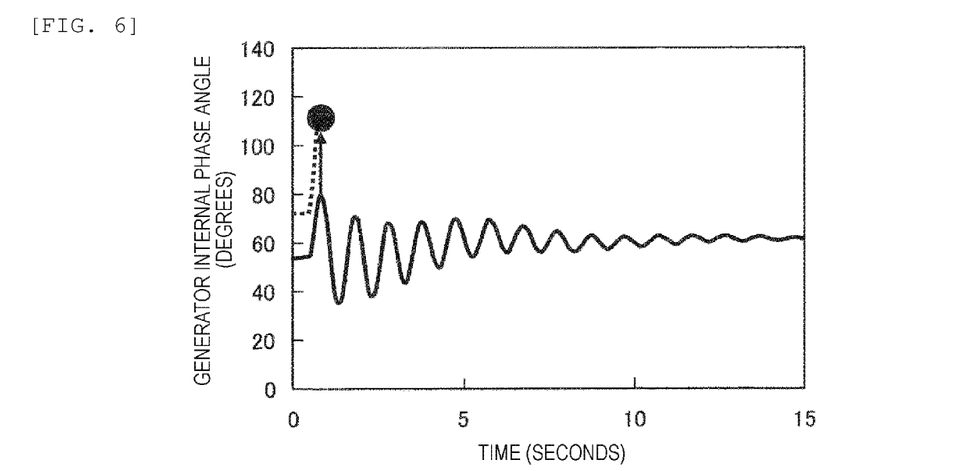
FIG. 6 is a diagram illustrating a correction result of the correction model for synchronous stability analysis.

FIG. 6 is a diagram illustrating a correction result of the synchronous stability analysis. FIG. 6 illustrates a time change in the synchronous generator internal phase angle in the event of the assumed failure. For example, the maximum value of the synchronous generator internal phase angle is corrected by a correction model. In the present example, by correcting, the maximum value of the internal phase angle of the generator is corrected from 80 to 110 degrees.

According to Example 1, in a case where the calculation of the state estimation does not converge or in a case where the accuracy is low, by correcting the generator internal phase angle, it is possible to improve the accuracy of the synchronous stability result by using the measurement value of the high-precision measurement device.

Example 2

Example 2 of the present invention will be described below. Example 2 is an example of a power system stabilization apparatus 30 in which the processing result of the stability analysis device of Example 1 is applied to power supply restriction. A description overlapping with the content described in Example 1 will be omitted.

Figure 7:
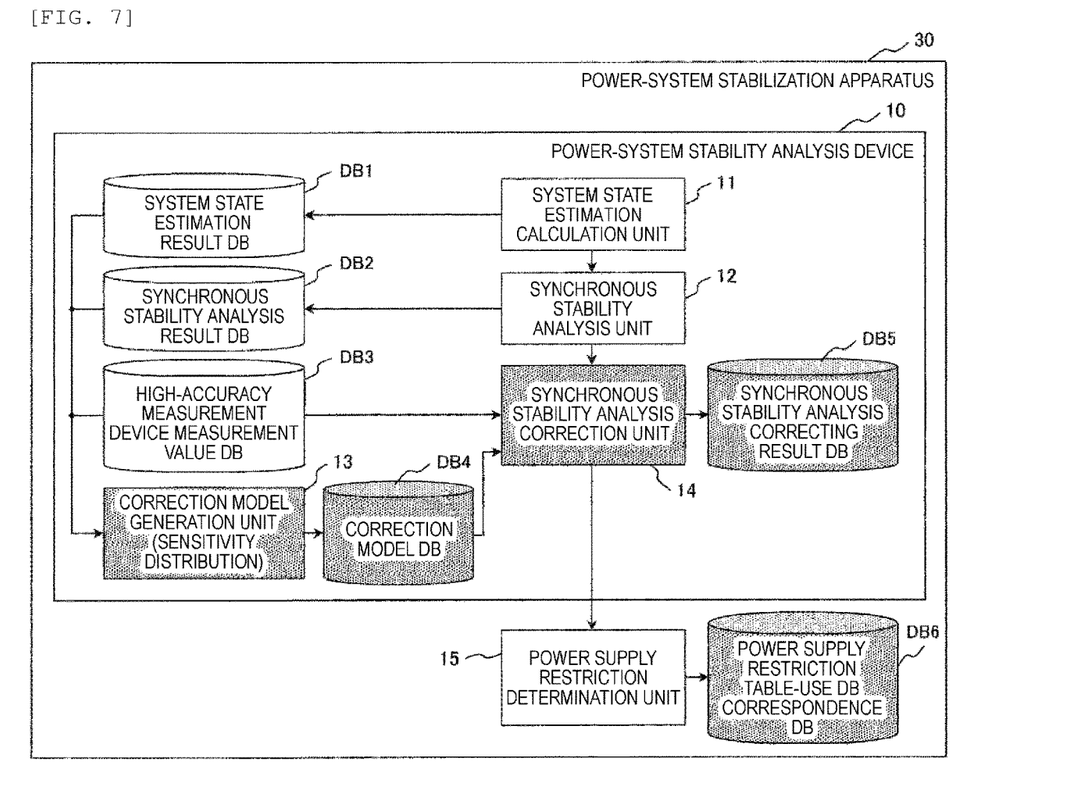
FIG. 7 is a software configuration diagram of a power system stabilization apparatus in which a power supply restriction determination unit and a power supply restriction table-use database correspondence database are added to FIG. 1.

The power system stabilization apparatus 30 of Example 2 illustrated in FIG. 7 is an apparatus for stabilizing a power system by adding a power supply restriction determination unit and a power supply restriction table-use database correspondence database DB6 to the power system stability analysis device 10 of Example 1.

Here, the power supply restriction determination unit 15 determines an appropriate power-controlled generator for preventing a power failure from the synchronous stability result. The determined power-controlled generator is loaded and stored in the power supply restriction table-use database correspondence database DB6 as a power supply restriction table-use database.

Figure 8:
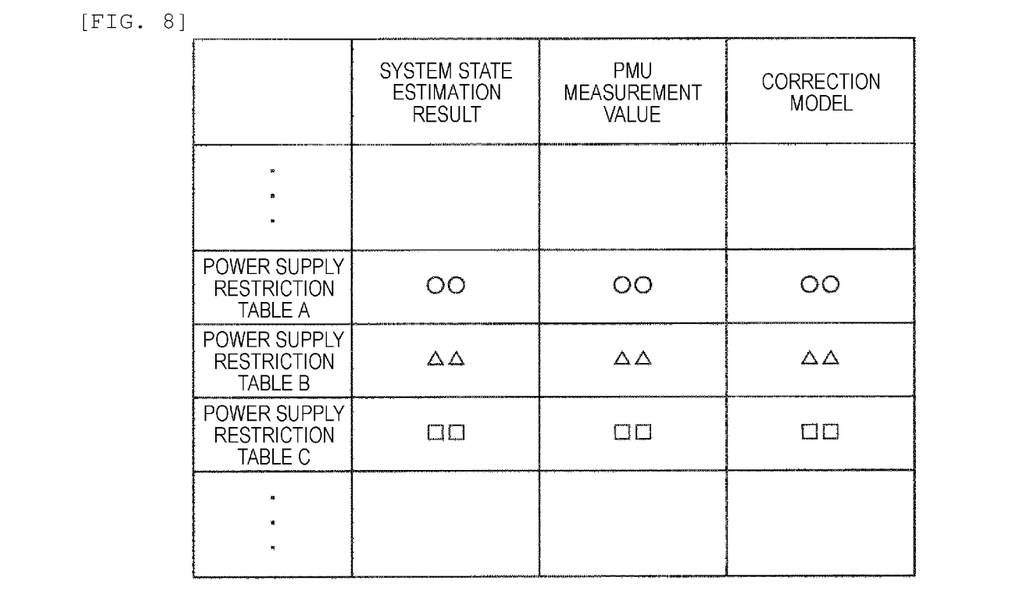
FIG. 8 is a diagram illustrating an output method of a database corresponding to a power supply restriction table-use database.

FIG. 8 is an example of the output of the power supply restriction table-use database DB6. DB6 is formed in a vertical and horizontal matrix, and for example, the horizontal axis has the system state estimation result, the PMU measurement value, and the correction model as a stability analysis result, and the vertical axis has a plurality of power supply restriction tables determined by the stability analysis result.

By providing the power supply restriction table-use database DB6 with a plurality of types of power supply restriction tables reflecting the stability analysis results after correction, for example, when an assumed failure occurs and power supply restriction becomes indispensable, it is possible to target a power-controlled generator determined based on accurate estimation of the system state.

Figure 9:
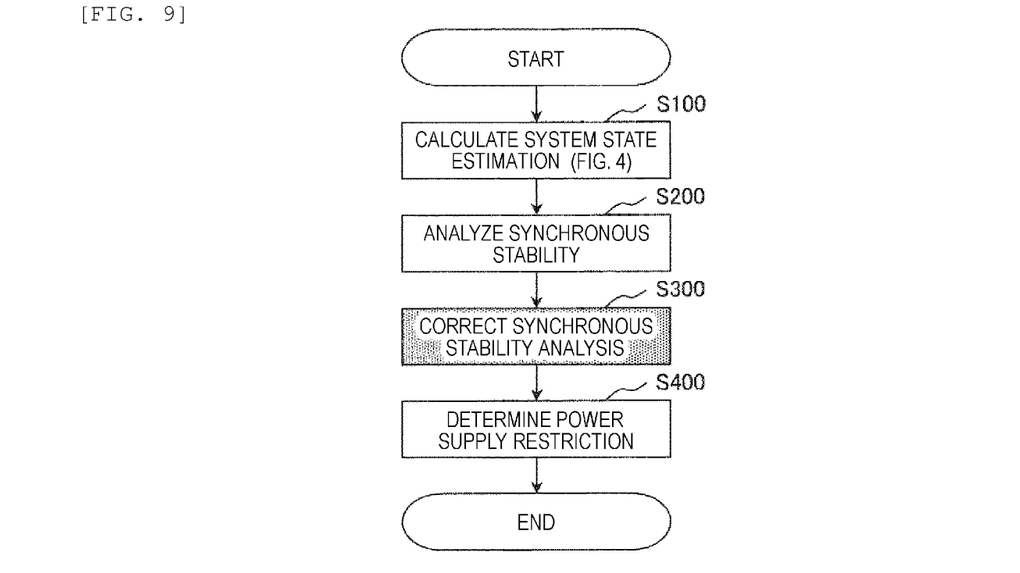
FIG. 9 is a diagram illustrating a flowchart of entire processing of a power system stabilization apparatus in which power supply restriction determination processing is added to FIG. 3.

FIG. 9 is an example of a flowchart illustrating the processing of the power system stabilization apparatus in which the processing step S400 of determining a power supply restriction is added to the flowchart illustrating the entire processing of the power system stability analysis device of FIG. 3. In the processing step S400, which is a difference from Example 1, a power-controlled generator is selected from the result of the synchronous stability analysis.

Figure 10:
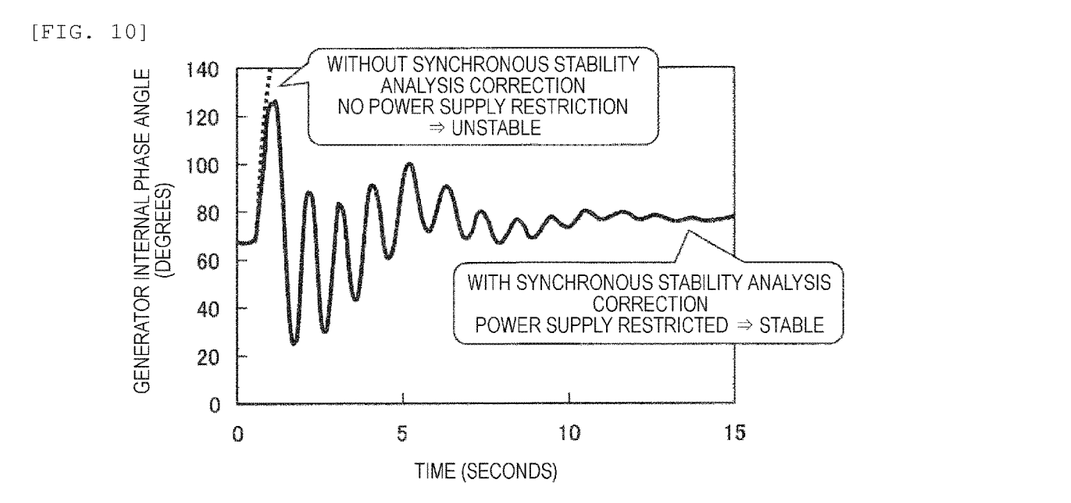
FIG. 10 is a diagram illustrating a difference in a power supply restriction result depending on the presence of a synchronous stability analysis correction unit.

FIG. 10 is a diagram illustrating a difference in a generator internal phase angle depending on the presence of a synchronous stability analysis correction. Without the synchronous stability analysis correction, the generator internal phase angle diverges and becomes unstable. In this case, a power supply restriction list was created without generator internal phase angle correction, and it was determined that there was no power supply restriction in the event of a failure. As a result, when a failure occurs during actual operation, the generator internal phase angle diverges, resulting in an unstable state.

On the other hand, with the synchronous stability analysis correction, the generator internal phase angle converged and became stable. Here, a power supply restriction list was created with generator internal phase angle correction, and it was determined that power supply was to be restricted in the event of failure. As a result, the generator internal phase angle becomes stable when a failure occurred during actual operation.

According to Example 2, in a case where the calculation of the state estimation does not converge or the accuracy is low, it is possible to prevent excessive and insufficient power supply restrictions of the power system stabilization apparatus by using the measurement value of the high-accuracy measurement device to improve the accuracy of the synchronous stability result.

Example 3

Example 3 of the present invention will be described below.

Figure 11:
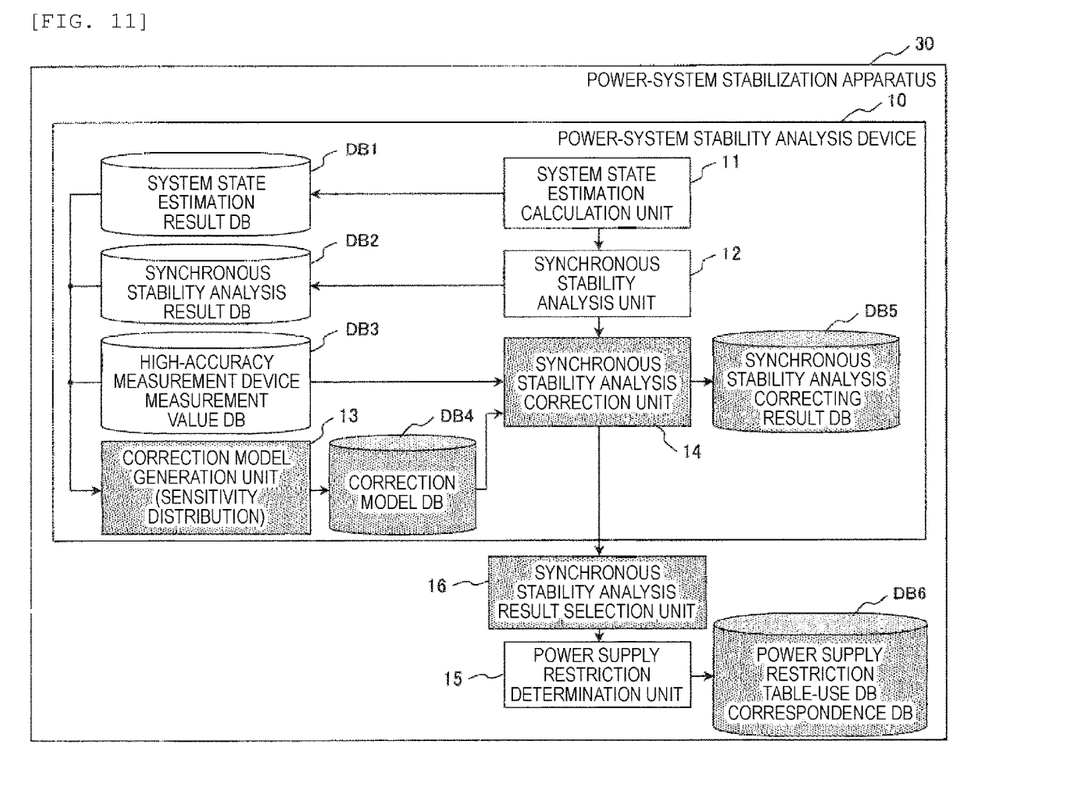
FIG. 11 is a software configuration diagram of a power system stabilization apparatus in which a synchronous stability analysis result selection unit is added to FIG. 7.

The power system stabilization apparatus 30 of Example 3 illustrated in FIG. 11 is a power system stabilization apparatus in which a synchronous stability analysis result selection unit 16 is added to the power system stabilization apparatus 30 of Example 2. A description overlapping with the content described in Example 2 will be omitted.

In the power system stabilization apparatus 30 of FIG. 11, the added synchronous stability analysis result selection unit 16 determines which value to use before correction or after correction. For example, if the difference between the measurement value of the high-accuracy measurement device and the system state estimation result is equal to or greater than the threshold value, the corrected value is used.

Figure 12:
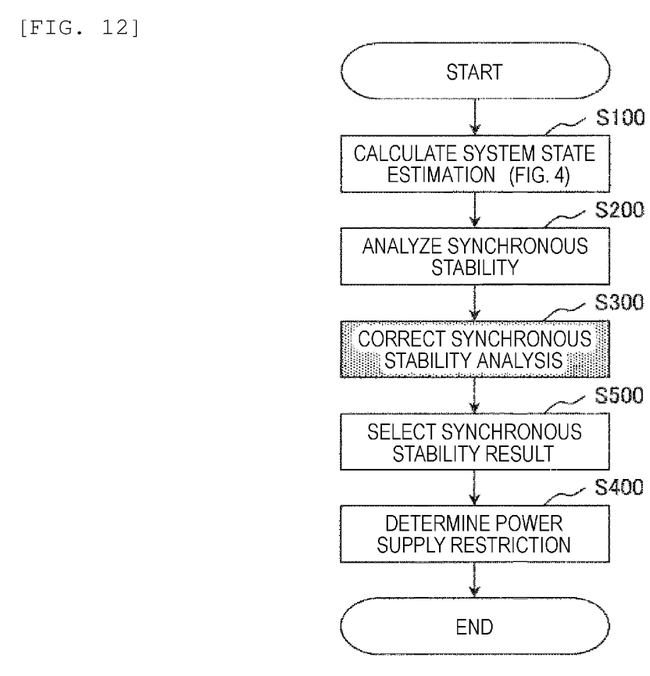
FIG. 12 is a diagram illustrating a flowchart of entire processing of a power system stabilization apparatus in which synchronous stability analysis result selection processing is added to FIG. 9.

FIG. 12 is an example of a flowchart illustrating the processing of the power system stabilization apparatus in which the processing step S500 of selecting a synchronous stability analysis result is added to the flowchart illustrating the entire processing of the power system stabilization apparatus of FIG. 9. In the processing step S500, which is the difference from Example 1, either the value before correction or the value after correction is selected.

According to Example 3, in a case where the calculation of the state estimation does not converge or the accuracy is low, it is possible to prevent excessive and insufficient power supply restrictions of the power system stabilization apparatus by using the measurement value of the high-accuracy measurement device to improve the accuracy of the synchronous stability result.

In the synchronous stability analysis correction unit of the present invention illustrated in FIG. 1, as illustrated in the processing step S300, at the time of correction, for example, a difference between a measurement value of the high-accuracy measurement device and a system state estimation result (output of an existing measuring instrument) is used as an input value for correcting the synchronous generator. Here, as the difference, the voltage phase difference of the measurement values between the existing device and the high-accuracy measurement device (degrees) in FIG. 5 is illustrated, but this can be similarly performed by using a proportion instead of the difference. In the present invention, the difference is described as a difference including obtaining a proportion in addition to obtaining a so-called difference.

REFERENCE SIGNS LIST

10: power system stability analysis device
11: system state estimation calculation unit
12: synchronous stability analysis unit
13: correction model generation unit
14: synchronous stability analysis correction unit
15: power supply restriction determination unit
16: synchronous stability analysis result selection unit
21: display unit
22: input unit
23: communication unit
24: CPU
25: memory
26: bus line
20: power system
30: power system stabilization apparatus
110: node
120: transformer
130: generator
140: transmission line
150: load
300: communication network
DB1: system state estimation result database
DB2: synchronous stability analysis result database
DB3: high-accuracy measurement device measurement value database
DB4: correction model database
DB5: synchronous stability analysis correcting result database
DB6: power supply restriction table-use database correspondence database

The invention claimed is:

1. A power system stability analysis device that analyzes stability of a power system by obtaining measurement data from a high-accuracy measurement device and existing measuring instruments installed in the power system, the device comprising:
   a system state estimation unit that estimates a system state of the power system by using the measurement data from the existing measuring instruments at a plurality of points in the power system;
   a synchronous stability analysis unit that analyzes synchronous stability in an assumed failure by using an estimation result of the system state; and
   a synchronous stability analysis correction unit that corrects the synchronous stability according to a difference between the estimation result of the system state and the measurement data of the high-accuracy measurement device to improve accuracy of synchronous stability analysis of the power system.

2. The power system stability analysis device according to claim 1, wherein the synchronous stability analysis correction unit includes a correction model creation unit that creates a sensitivity distribution from the estimation result of the system state, the measurement data of the high-accuracy measurement device, and past data of analysis results of the synchronous stability.

3. The power system stability analysis device according to claim 1, wherein
   the synchronous stability analysis correction unit shows a relationship between a voltage phase difference between the measurement data from the existing measuring instruments and the high-accuracy measurement device, a generator internal phase angle before correction which is the estimation result of the system state, and a generator internal phase angle after correction, and
   obtains a generator internal phase angle after correction from the generator internal phase angle before correction, which is the estimation result of the system state, and the voltage phase difference between the measurement data from the existing measuring instruments and the high-accuracy measurement device.

4. The power system stability analysis device according to claim 1, further comprising:
   a system state estimation result database that stores the estimation result of the system state;
   a synchronous stability analysis result database that stores an analysis result of the synchronous stability;
   a high-accuracy measurement device measurement value database that stores measurement data of a measurement value from a high-accuracy measurement device; and
   a synchronous stability analysis correction database that stores a correction result of the synchronous stability analysis.

5. A power system stabilization apparatus comprising:
   the power system stability analysis device according to claim 1 including
   a power restriction determination unit that determines an appropriate power-controlled generator for preventing a power failure in the event of an assumed failure in the power system by using synchronous stability obtained by the synchronous stability analysis correction unit, and
   a database that stores the determined power-controlled generator, wherein
   the power system stabilization apparatus controls the determined power-controlled generator in the event of the assumed failure.

6. A power system stabilization apparatus comprising:
   the power system stability analysis device according to claim 1 including
   a power restriction determination unit that determines an appropriate power-controlled generator for preventing a power failure in the event of an assumed failure in the power system by using synchronous stability obtained by the synchronous stability analysis correction unit,
   a database that stores the determined power-controlled generator, and
   a synchronous stability analysis result selection unit that selects one of the synchronous stability when not performing correction and when performing correction in the synchronous stability analysis correction unit, wherein
   when a difference between the synchronous stability before correction and after correction is equal to or greater than a threshold, the power system stabilization apparatus selects the synchronous stability after correction.

7. A power system stabilization analysis method for analyzing stability of a power system by obtaining measurement data from a high-accuracy measurement device and existing measuring instruments installed in the power system, the method comprising:
   estimating a system state of the power system by using the measurement data from the existing measuring instruments at a plurality of points in the power system;
   analyzing synchronous stability in an assumed failure by using an estimation result of the system state; and
   correcting the synchronous stability according to a difference between the estimation result of the system state and the measurement data from the high-accuracy measurement device to improve accuracy of synchronous stability analysis of the power system.

8. The power system stabilization analysis method according to claim 7, wherein
   the estimation result of the system state, the measurement data of the high-accuracy measurement device, and a correction model for a sensitivity distribution created from past data of analysis results of the synchronization stability are used in the correction of the synchronous stability.

9. The power system stabilization analysis method according to claim 7, wherein
   regarding a relationship between a voltage phase difference between the measurement data from the existing measuring instruments and the high-accuracy measurement device, a generator internal phase angle before correction, which is the estimation result of the system state, and a generator internal phase angle after correction,
   the generator internal phase angle after correction is obtained from the generator internal phase angle before correction, which is the estimation result of the system state, and the voltage phase difference between the measurement data from the existing measuring instruments and the high-accuracy measurement device, in the correction of the synchronous stability.

10. The power system stabilization method comprising:
    the power system stabilization analysis method according to claim 7;

determining and storing an appropriate power-controlled generator for preventing a power failure in the event of an assumed failure in the power system by using the synchronous stability after correction; and controlling the determined power-controlled generator in the event of the assumed failure.

11. The power system stabilization method comprising:

the power system stabilization analysis method according to claim 7;

determining and storing an appropriate power-controlled generator for preventing a power failure in the event of an assumed failure in the power system by using the synchronous stability after correction;

selecting one of the synchronization stability when not performing correction and when performing correction; and selecting the synchronous stability after correction when a difference between the synchronous stability before correction and after correction is equal to or greater than a threshold.

* * * * *